United States Patent [19]

Anderka

[11] 3,950,762

[45] Apr. 13, 1976

[54] DRAWING METHOD AND DRAWING INSTRUMENT

[75] Inventor: Gerold Anderka, Ellerbek, Germany

[73] Assignee: Koh-I-Noor Rapidograph, Inc., Bloomsbury, N.J.

[22] Filed: June 18, 1975

[21] Appl. No.: 587,921

[30] Foreign Application Priority Data

June 18, 1974 Germany............................ 2429115
May 17, 1975 Germany............................ 2522012

[52] U.S. Cl..................... 346/140 R; 222/55; 239/63
[51] Int. Cl.[2] G01D 15/16; B67D 5/08; B05B 12/08
[58] Field of Search.......... 346/140; 239/63; 222/55

[56] References Cited

UNITED STATES PATENTS

| | | | |
|---|---|---|---|
| 3,169,821 | 2/1965 | Miller | 346/140 |
| 3,371,350 | 2/1968 | Sanderson et al. | 346/140 |
| 3,424,198 | 1/1969 | Erbach | 137/583 |
| 3,512,172 | 5/1970 | Colacchi | 346/75 |
| 3,553,708 | 1/1971 | Carreiva et al. | 346/1 |
| 3,556,477 | 1/1971 | Schweitzer | 251/335 |
| 3,708,798 | 1/1973 | Hildenbrand et al. | 346/140 |
| 3,719,952 | 3/1973 | Elbaum | 346/75 |
| 3,747,120 | 7/1973 | Stemme | 346/75 |
| 3,787,882 | 1/1974 | Fillmore et al. | 346/140 X |
| 3,820,121 | 6/1974 | Rich et al. | 346/140 |

FOREIGN PATENTS OR APPLICATIONS

| | | | |
|---|---|---|---|
| 619,968 | 5/1961 | Canada | 346/140 |
| 738,745 | 10/1955 | United Kingdom | 346/140 |
| 707,894 | 4/1954 | United Kingdom | 346/140 |
| 716,988 | 10/1954 | United Kingdom | 346/140 |
| 1,266,520 | 4/1968 | Germany | 346/140 |

*Primary Examiner*—George H. Miller, Jr.
*Attorney, Agent, or Firm*—David H. Semmes

[57] ABSTRACT

The invention relates to a method for drawing, particularly automatic drawing with at least one tubular pen which has a cylindrical body with the writing tubule held in front in the latter, as well as to a drawing instrument, particularly for automatic drawing apparatus.

15 Claims, 4 Drawing Figures

DRAWING METHOD AND DRAWING INSTRUMENT

BACKGROUND OF THE INVENTION

A problem in automatic drawing and in the use of automatic drawing apparatus is to maintain a constant, sufficiently rapid flow of the writing fluid, despite a high drawing speed to draw uniformly wide and fully covering lines. On the other hand, it must be ensured in automatic drawing that no ink will flow or begin to drop after a line is completed, that is, after the tubular pen has been lifted, and that particularly no drop will form on the tubular pen since this could lead to ink-spots when the pen is placed again on the drawing surface.

A drawing instrument is already known (DOS No. 2,235,737), where it has been tried to solve the above mentioned problems by regulating the volume of the writing fluid in the tubular pen, whereby the amount of writing fluid to be supplied during drawing is controlled by means of a speed signal generator connected to the drawing instrument to generate a speed signal which indicates the relative movement between the tubular pen and the drawing surface. A pump is controlled corresponding to the speed signal in order to supply writing fluid to the tubular pen, thus ensuring at all times a continuous adequate supply of writing fluid during drawing.

It is a disadvantageous fact that this type of known drawing instrument has considerable inertia, inherent in its complicated mechanical design, so the supply of writing fluid cannot be stopped without delay therein when the drawing process is completed. Therefore, when the tubular pen is lifted from the drawing surface the entire assembly carrying the tubular pen continues to move on so that a speed signal is generated and some writing fluid is additionally supplied to the tubular pen. This additional fluid supply results in the formation of an ink drop on the writing tubule, so that either ink-spots are formed or lines are widened when the pen is applied again.

OBJECTS OF THIS INVENTION

It is therefore an object of the invention to provide a drawing method and a drawing instrument wherein the supply of writing fluid is controlled under practically all operating conditions to correspond to the actually required amount of writing fluid.

This is achieved according to the invention with a method of the above-described type in this way that the actual value of the writing fluid pressure in the tubular pen is measured and compared with a given nominal value, and that a writing fluid feed mechanism is actuated when the actual value differs from the nominal value.

In the method according to the invention, the actual value of the writing fluid pressure is thus constantly measured, and hence also the amount of writing fluid used up during the drawing process. By comparing this actual value with a nominal value, corresponding to the writing fluid pressure required for even drawing, the supply of writing fluid to the tubular pen can be so controlled that the actual value is always adapted practically without delay to the nominal value.

When the tubular pen is lifted from the drawing surface, the continuing movement of the drawing instrument has no effect on the supply of writing fluid, because as soon as writing fluid is no longer withdrawn, the writing fluid pressure is set automatically to the nominal value, hence to the optimum value desired for drawing.

The actual value can be measured at various points, but preferably immediately in the range of the stylus tip of the tubular pen. Thereby influences and errors from inertia, pressure fluctuations within the tubular pen, etc., are avoided by the consumption of writing fluid being measured in the area closest to the outlet end of the writing tubule.

Automatic drawing apparatus operation is particularly expedient if the tubular pen held in the drawing head need not be exchanged when changing from one line width to another line width, wherein several tubular pens are arranged in a holder and brought selectively in contact with the drawing surface by means of this holder so that lines of different width are drawn.

Furthermore, it is frequently of advantage if two or more lines are drawn simultaneously with an automatic drawing apparatus, for example, in making maps, etc., where the writing tubules of at least two tubular pens are simultaneously in contact with the drawing surface.

In one embodiment of the method according to the invention, several tubular pens are therefore connected in parallel to the writing fluid feed mechanism, with the actual values of their writing fluid pressures measured so that if the actual value of the writing fluid pressure of at least one tubular pen differs from the nominal value, the feed mechanism is actuated.

According to this first embodiment, the supply of writing fluid into the tubular pens which are simultaneously in ready position, and/or in use, is effected from a single writing fluid feed mechanism, whereby technical expenditures for carrying out the method are minimized. This connection of all tubular pens to a single feed mechanism is possible according to this invention since the supply of writing fluid to one or several tubular pens will depend upon the drop of the actual value of the writing fluid pressure from a given nominal value. This nominal value is set so that the tubular pen(s) which are not in contact with the drawing surface do not supply writing fluid. If the actual value in a tubular pen differs from this nominal value, due to the use of this tubular pen, writing fluid is supplied to permit a uniform discharge of the writing fluid from the tubular pen being used, without the pressure rising above the nominal value. Therefore, the nominal value of the fluid pressure in the unused tubular pens is not exceeded, consequently no writing fluid flows or drips from these pens even though they are connected to the same writing fluid feed mechanism that also supplies writing fluid to the tubular pen actually being used.

The invention also comprises a drawing instrument, particularly for automatic drawing apparatus, wherein at least one tubular pen, with a writing tubule held in front of a cylindrical body includes a regulating and control device.

According to the apparatus embodied according to this invention a drawing instrument is characterized in that a pressure sensor is connected to the tubular pen to measure the actual value of the writing fluid pressure generated during the drawing in the tubular pen. The outlet of the pressure sensor is connected to a comparison unit for comparing the output signal which indicates the actual value, with a nominal value signal. The output of the comparison unit is connected to a writing fluid feed mechanism which in turn supplies writing fluid to the cylindrical body of the tubular pen.

In one apparatus embodiment of the invention a number of tubular pens are connected to the writing fluid feed mechanism so that each pen has a pressure sensor coupled with a writing fluid delivery mechanism.

The pressure sensors of each tubular pens are preferably all connected to a common comparison unit. Thereby the comparison unit supplies an output signal to the writing fluid feed mechanism as soon as one of the pressure sensors indicates a deviation of the actual value of the writing fluid pressure in its tubular pen from the given nominal value.

In a second apparatus embodiment of the invention a single pressure sensor for all tubular pens connected to the writing fluid feed mechanism is taught to be sufficient. Such a pressure sensor can be connected, for example, via individual lines to the front end regions of all tubular pens to thereby actuate the comparison unit and the writing fluid feed mechanism as soon as the writing fluid pressure in one of the connected tubular pens drops below the nominal value.

Such a single pressure sensor can also be connected, in an alternative, to the line connecting the writing fluid feed mechanism and the tubular pens. The resulting delays in response to the pressure variation could be neglected in this practice. The given nominal value could be set to a somewhat higher value in order to also take into account friction losses which appear between the writing tubules and the pressure measuring point.

In order to keep three tubular pens, for example, constantly ready to work in a drawing instrument provided with a number of tubular pens, and to be able to bring two of these tubular pens simultaneously in contact with the drawing surface, as necessary, the tubular pens can be arranged side by side in a common holder. The front end of the writing tubule of the central tubular pen may therefore be arranged lower than the front ends of the other two tubular pens. The holder can be pivoted about a horizontal axis extending perpendicularly to the connecting line of the three tubular pens. In this fashion one of the three tubular pens can very advantageously be brought into selective contact with the drawing surface by a simple pivotal movement of the holder.

Of course, it would also remain possible to apply the central and one of the two outer tubular pens simultaneously on the drawing surface through an additional lowering of the holder.

The pressure sensor preferably employed according to this invention is a piezoresistive pressure sensor. Such pressure sensors are described, for example, in the journal "messen + pruefen / automatik", Feb. 1974, p. 89 to 92.

A comparison unit according to the instant invention can consist of a conventional bridge connection, for example, a Wheatstone Bridge, wherein one branch is adjustable according to the nominal value. If the actual value differs from the adjusted nominal value the bridge is mistuned and the resulting bridge signal can thereby be used to control the writing fluid feed mechanism which supplies writing fluid to the writing tubule.

The writing fluid feed mechanism according to the present invention preferably comprises an electro-magnetically controlled positive displacement pump which has a plunger, for example, and a bellows-type storage chamber for the writing fluid; the chamber being varied by the movement of the plunger.

The invention will be described below more fully on the basis of the drawings showing embodiments in a schematic and simplified representation.

DESCRIPTION OF THE PREFERRED EMBODIMENTS

Figure 1:
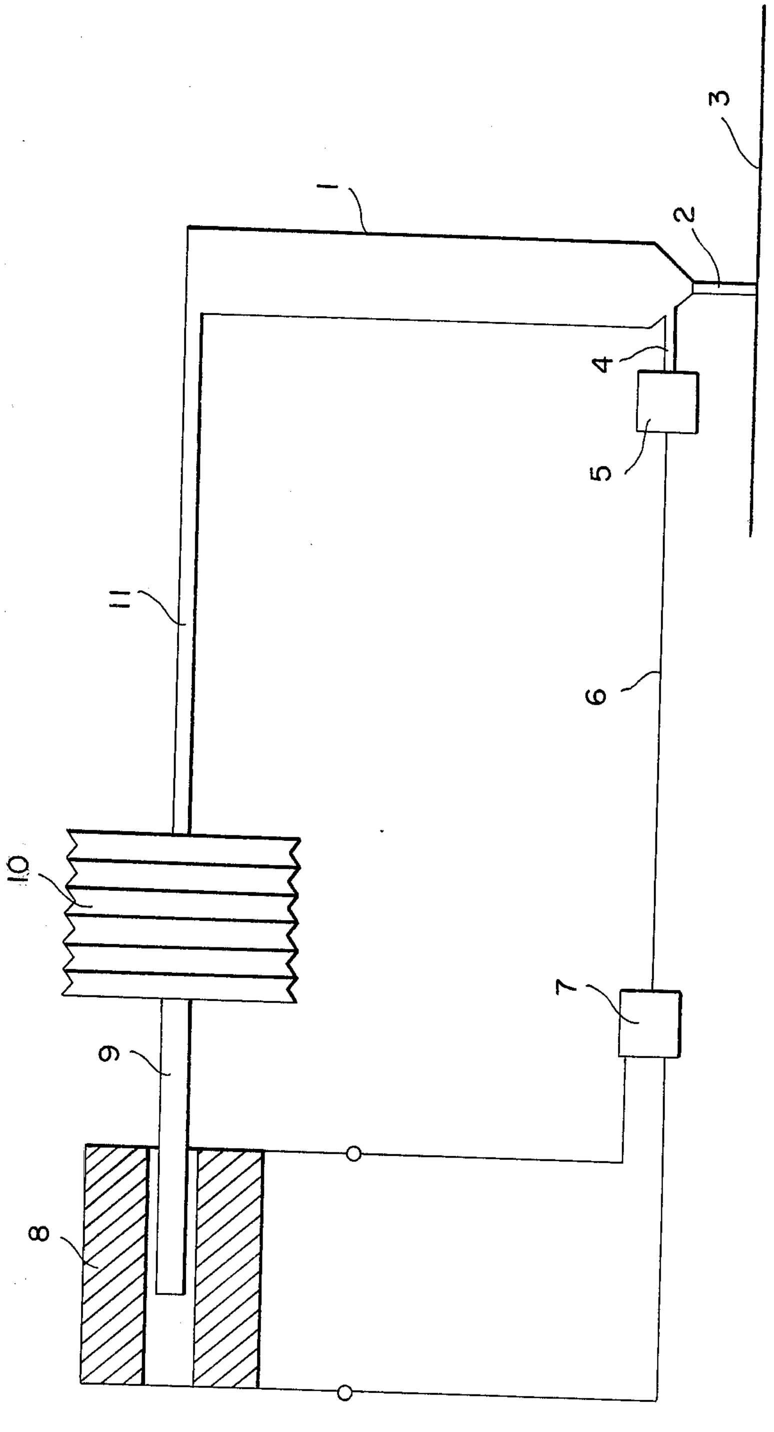
FIG. 1 is a schematic of a drawing instrument according to the invention with one tubular pen.

The tubular pen represented schematically in FIG. 1 comprises a cylindrical body 1 with a stylus or writing tubule 2 held in the front region. Such tubular pens are known per se and a tubular pen can be used, as is represented, for example, in the above mentioned DOS No. 2,235,737. Corresponding details of the structural design of this tubular pen are omitted for reasons of simplicity and neatness.

Connected to the front region of the tubular pen is a pressure sensing line 4 which communicates the interior of the tubular pen with a pressure sensor 5. This pressure sensor is, for example a piezoresistive pressure sensor suitable for purposes of this invention are, for example, the pressure sensors designated LX 1601 G and IX 1701 G and manufactured by National Semiconductor Corp. of Santa Clara, California.

Such piezoresistive pressure sensors are capable of measuring relative low underpressures, even of the order of fractions of the several mm of water produced during drawing with a tubular pen. The electrical output signal generated by the pressure absorber is fed through line 6 to a comparison unit 7, which can be for example, a conventional Wheatstone Bridge connection, as mentioned, which are frequently used for nullity comparisons.

A signal can thereby be in the form of a voltage formed when the bridge connection is mistuned, that is, when the actual value differs from the nominal value. This signal can act on magnet coil 8 to vary its magnetic field, and move plunger 9. According to this invention the variation extends normally in only one direction, because a deviation from a nominal value for drawing is always in the direction of an underpressure, and hence plunger 9 moves normally to the right in the figures. From this rightward movement the volume of writing fluid in the bellows-type storage chamber 10 is reduced so that an additional volume of writing fluid will flow through line 11 to the tubular pen. As a controlled result the actual value of the writing fluid pressure is adapted to the nominal value.

As it can be readily appreciated, according to this invention, regulation of the actual value is effected with a minimum of delays, with the optimum nominal value of the writing fluid pressure required for drawing always maintained at the outlet end of writing tubule 2. Even when drawing at maximum speed, a completely covering line of the desired line width is always drawn on the drawing surface. When the tubular pen is lifted from the drawing surface the pressure sensor determines immediately that the fluid pressure no longer differs from the nominal value. No writing fluid is then supplied because no writing fluid is fed from the bellows-type storage chamber to the tubular pen, even if the drawing instrument continues to move over the drawing surface 3 after the pen has been lifted. This advantageous operation is necessary because the great mass of the drawing instrument generally does not permit a sudden braking.

The writing fluid pressure is thus at the nominal value when the tubular pen is lifted from the drawing surface. There are no difficulties when the pen is applied again because the new drawing process can start again with the nominal value of the writing fluid pressure, hence a desired amount of writing fluid is delivered from the writing tubule without the formation of inkspots or with increases of the line width.

Figure 2:
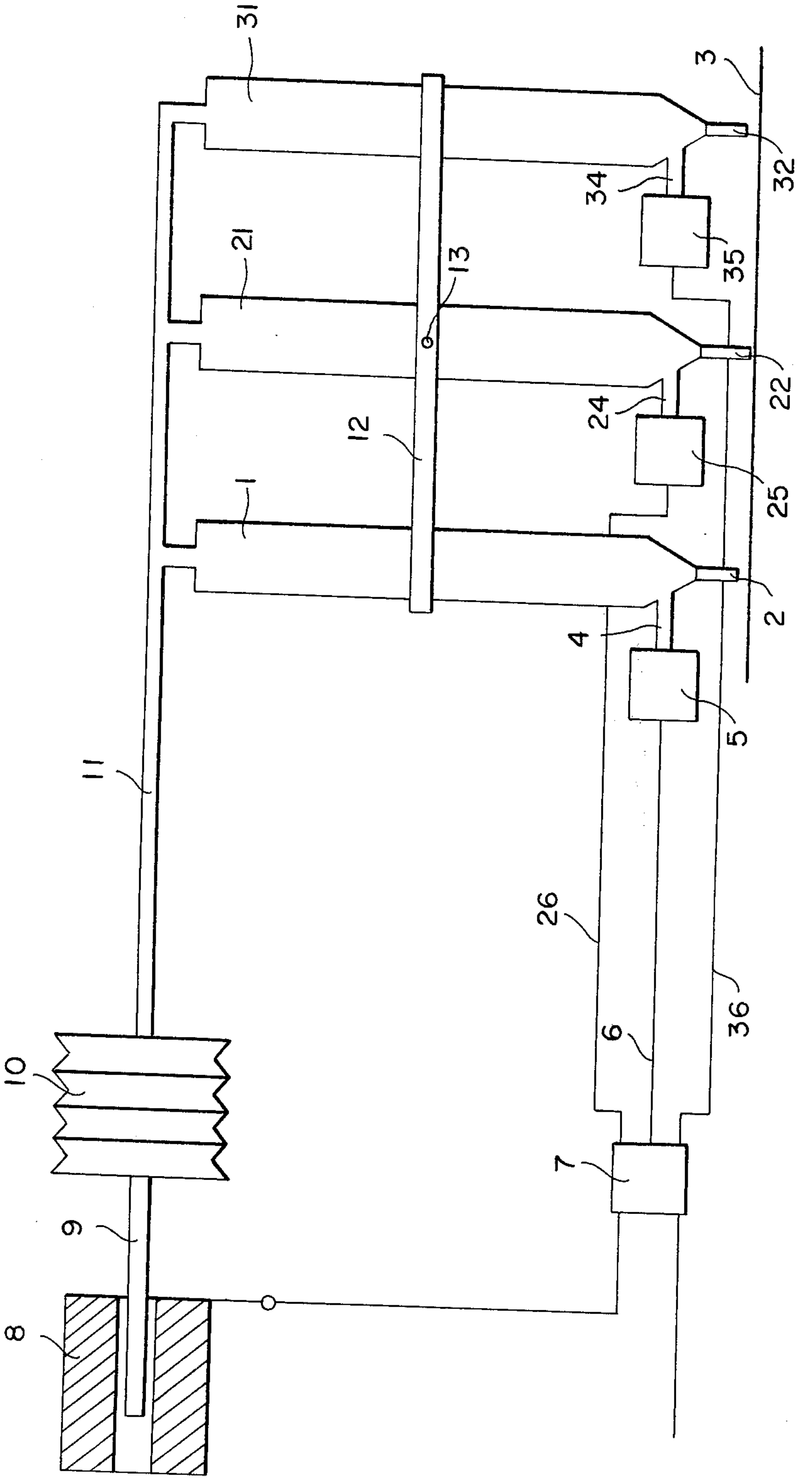
FIG. 2 is a schematic of a drawing instrument according to the invention with three tubular pens.

The design of the drawing instrument represented schematically in FIG. 2 corresponds partly to the design of the instrument in FIG. 1, and the same parts and elements have been provided with the same reference numbers.

In addition to the tubular pen shown in FIG. 1, two other tubular pens with cylindrical bodies 21, 31 and writing tubules 22, 32 are represented. All three tubular pens are secured in a holder 12, which is held in an automatic drawing position (not shown) and can be turned about an axis 13 extending horizontally and also perpendicularly to a line connecting the three tubular pens.

It can be readily seen that tubular pen 2, 22 or 32 can be brought selectively in contact with the drawing surface by the pivotal movement about axis 13, so that drawing with three different line widths is possible by simply turning the holder without having to exchange the tubular pens.

As shown, all three tubular pens are connected parallel to line 11, hence to the writing fluid feed mechanism containing plunger 9 and the bellows-type storage chamber 10 for the writing fluid. In addition, the additional tubular pens, as well as the tubular pen with cylindrical body 1 and writing tubule 2, have openings which are connected to the lines 24, 34, each being connected to pressure sensors 25, 35 and thus will measure the actual value of the writing fluid pressure in each tubular pen. The pressure sensors 25, 35, are of the same type as pressure sensor 5, and they are coupled over lines 26, 36 with comparison unit 7 to supply it with electrical output signals.

This arrangement has the effect that comparison unit 7 applies voltage to the magnet coil when a signal is received over any one of the lines 6, 26, 36 which indicates a deviation of an actual value of the writing fluid pressure from a nominal value, thus effecting the supply of writing fluid over line 11 in the above described manner.

As shown, line 11 is connected to all tubular pens, and the supplied writing fluid serves to restore the actual value of the writing fluid pressure to the nominal value, that is, the tubular pen being used (in the represented embodiment the central tubular pen) is the only one at the reduced pressure and only it will receive writing fluid so that a uniform flow of writing fluid is ensured even at a high drawing speed.

As mentioned above, the other tubular pens despite their common connection to the writing fluid feed mechanisms, are held in a state in which they do not drop and do not form inkspots when they are applied on the drawing surface, since the nominal value of the writing fluid pressure at which the tubular pens do not drop is never exceeded by the supply of writing fluid.

It should be pointed out that it is naturally possible to provide a separate comparison unit for each of the different pressure sensors, to thereby energize magnet coil 8.

Figure 3:
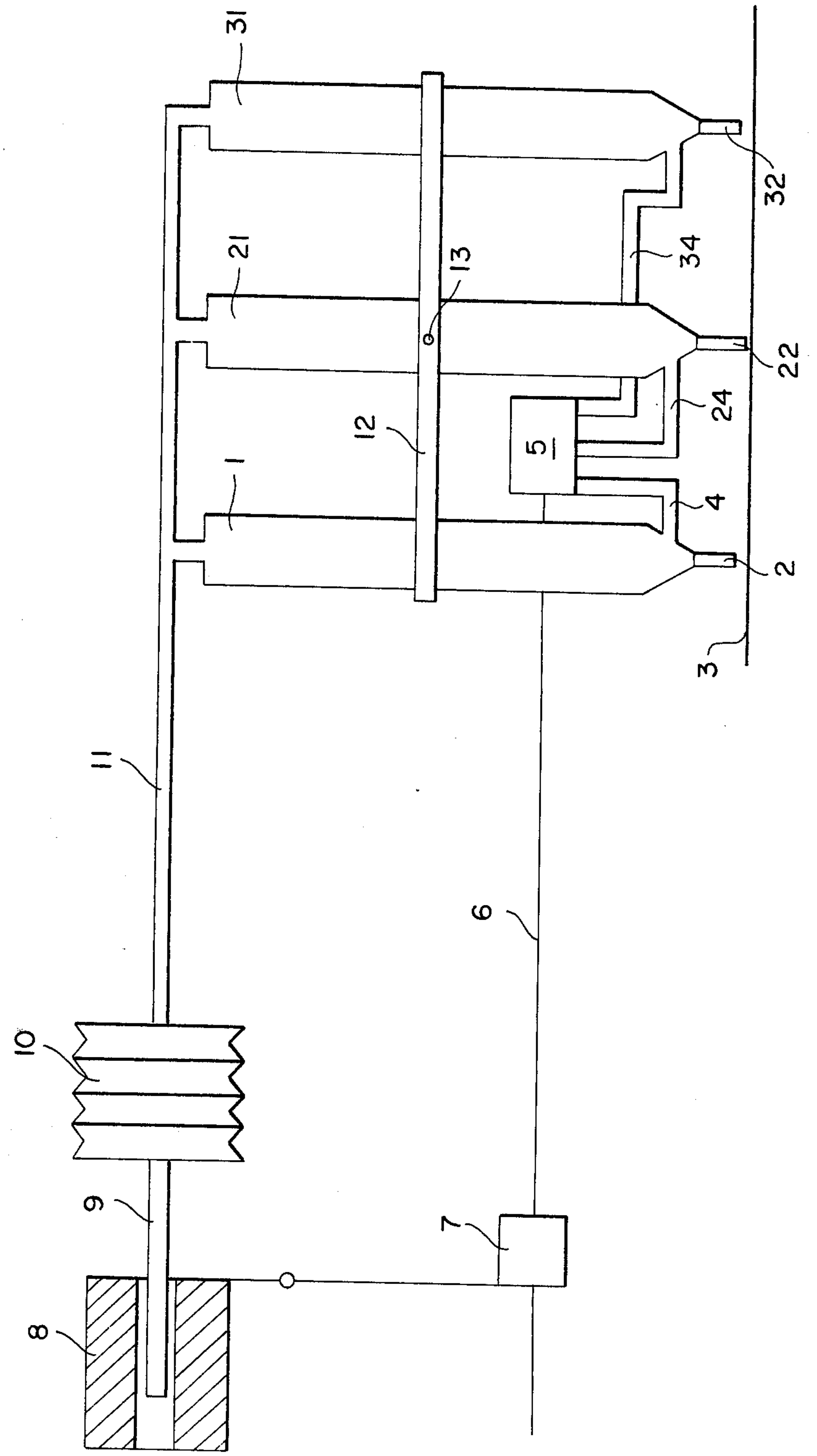
FIG. 3 is a schematic of another embodiment with three tubular pens and a single pressure sensor.

The embodiment represented in FIG. 3 corresponds substantially to the embodiment in FIG. 2, and the same elements have therefore been provided with the same reference numbers.

The difference between the embodiment according to FIG. 2 and the embodiment according to FIG. 3 is seen in the act that in the latter only a single pressure sensor 5 is provided and the lines 4, 24, 34 connected therewith to each line is connected to the front end region of one of the three tubular pens This pressure sensor 5 therefore transmits to comparison unit 7 over line 6 a signal deviating from the nominal value signal only if the actual value in one of the tubular pens drops below the nominal value of the writing fluid pressure. The writing fluid feed mechanism is thus actuated in the manner described in connection with the embodiment according to FIG. 2, and writing fluid is fed to the tubular pens over connecting line 11.

Figure 4:
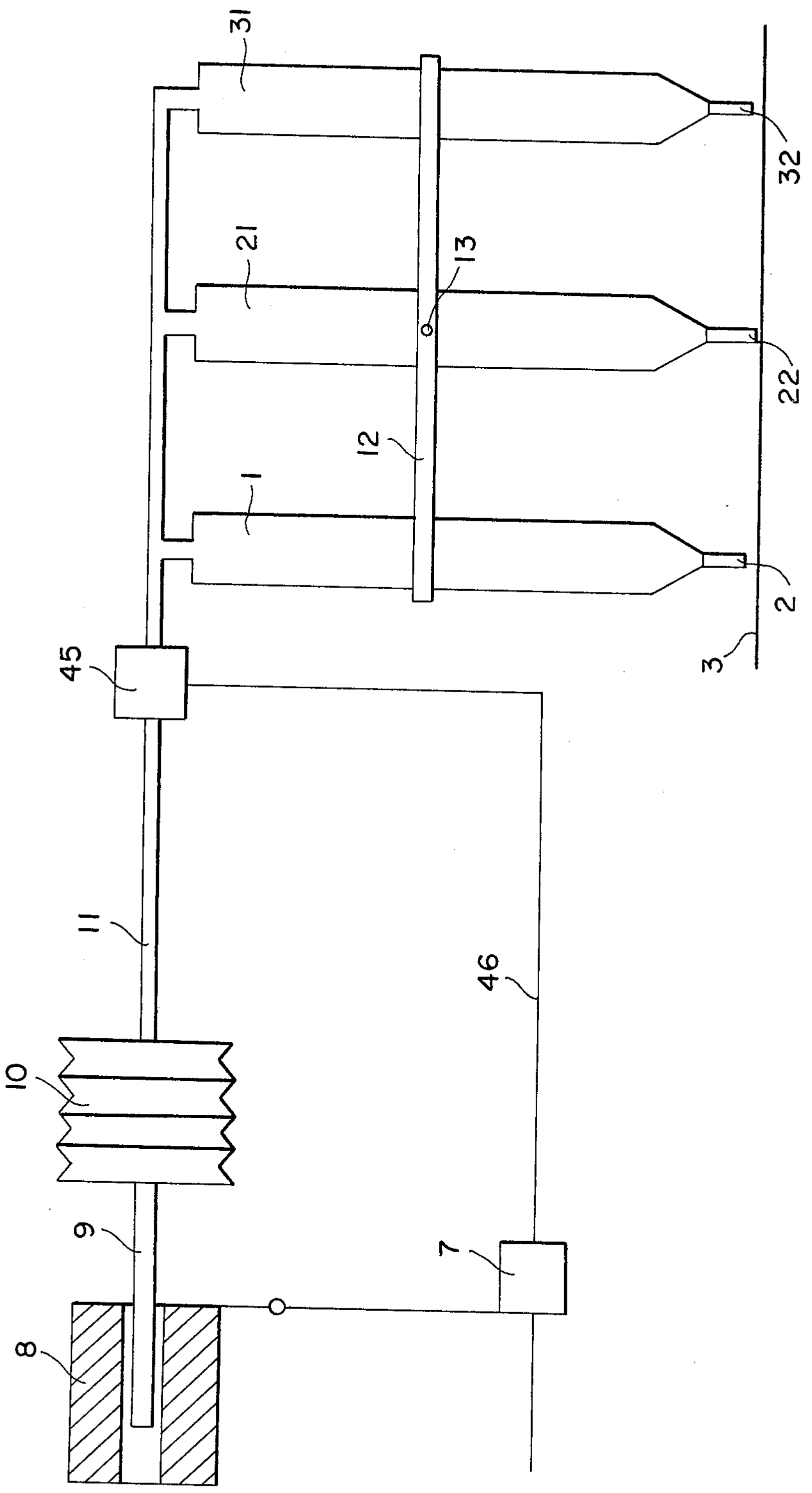
FIG. 4 is a schematic of yet another embodiment with three tubular pens and a single pressure sensor.

In the embodiment schematically represented in FIG. 4, which is substantially identical with the embodiment according to FIG. 3, so that the same elements are provided with the same reference numbers, there is provided a single pressure sensor 45 with which the writing fluid pressure is monitored. This pressure sensor 45 is connected, however, to connecting line 11 which connects the bellows-type storage chamber 10 of the writing fluid feed mechanism with each of the tubular pens. This pressure sensor determines thus deviations from the nominal value of the writing fluid pressure in connecting line 11 and actuates the writing fluid feed mechanism over line 46 and comparison unit 7, so that the feed mechanism automatically supplies the proper writing fluid to the tubular pens.

As mentioned above, a measurement of the writing fluid pressure in the front end region of the tubular pens is particularly favorable because it permits pressure variations determinations without delays and without influences caused by friction losses or pressure fluctuations. Nevertheless the pressure can also be measured in connecting line 11, since the time required for the spreading of the pressure variation is correctably negligible, hence here is no risk that the operation of the drawing instrument will be impaired by inertia. Because there are certain friction losses between the writing tubules 2, 22 and 32 and the point where pressure sensor 45 is connected to connecting line 11, it is advisable to set comparison unit 7 in this case to a somewhat higher nominal value in order to compensate for the friction losses.

I claim:

1. A method for automatic drawing with an automatic drawing machine including at least one tubular pen having a cylindrical body which supports a writing tubule at its front region comprising the steps of:

A. supporting said at least one tubular pen within a carriage assembly;
B. sensing the actual value of pressure for writing fluid within said at least one pen;
C. comparing said actual fluid pressure with a given nominal value for said fluid pressure; and
D. actuating a writing fluid feed mechanism to adjust said sensed actual fluid pressure when said sensed value differs from said nominal value.

2. The method according to claim 1, wherein the step of sensing the actual value of fluid pressure within said pen comprises measuring said pressure at the region of the front end of said tubular pen.

3. The method according to claim 1, wherein said at least one tubular pen comprises more than one and said actual pressure value is sensed by a parallel pressure sensing of all of said pens.

4. The method according to claim 2, wherein said at least one tubular pen comprises more than one and said actual pressure value is sensed by a parallel pressure sensing of all of said pens.

5. An automatic drawing instrument comprising at least one tubular pen supported upon a holder assembly, said at least one tubular pen further comprising a cylindrical body having a writing tubule supported at its front end, said automatic instrument further including:

A. a writing fluid source connected to said at least one tubular pen, having a pressure regulating feed mechanism;

B. a comparison unit operable to generate a control signal for said feed mechanism when an input signal differs from a nominal value; and C. means to sense the actual writing fluid pressure of said at least one tubular pens and operable to generate said input value to said comparison unit whereby said actual pressure is sensed and said pressure regulating feed mechanism is actuated to adjust said sensed value to said nominal value when said actual differs from said nominal value.

6. An automatic drawing instrument according to claim 5 wherein said at least one tubular pen comprises more than one and each pen includes pressure lines in parallel connection to a pressure sensor comprising said means to sense actual pressure in each of said pens.

7. An automatic drawing instrument according to claim 5 wherein said means to sense actual writing fluid pressure comprises a pressure line proximate the front end of said at least one writing pen.

8. An automatic drawing instrument according to claim 5 wherein said at least one tubular pen comprises more than one and said means operable to sense actual writing fluid pressure and generate said input signal comprises individual pressure sensors for each of said pens operably connected to a single comparison unit.

9. An automatic drawing instrument according to claim 5 wherein said means to sense actual writing fluid pressure comprises a piezoresistive pressure sensor.

10. An automatic drawing instrument according to claim 5 wherein said comparison unit comprises a Wheatstone Bridge, said input signal is an electrical voltage from a piezoresistive pressure sensor; and one branch of said bridge is operable to be set corresponding to said nominal value.

11. An automatic drawing instrument according to claim 5 wherein said at least one tubular pen comprises more than one and said means operable to sense actual writing fluid pressure and generate said input signal comprises a single pressure connection to each of said pens and operably connected to a single comparison unit.

12. An automatic drawing instrument according to claim 5 wherein said at least one tubular pen comprises three in parallel fluid connection to said pressure regulating fluid source mechanism and said holder assembly supports said pens in side by side relation with the middle pen writing tubule arranged lower than the front ends of said other tubules, said holder further operable to be pivoted about a horizontal axis extending perpendicularly to a connecting plane of the three pens.

13. An automatic drawing instrument according to claim 12 wherein each of said three tubular pens includes within said actual pressure sensing means pressure lines proximate their respective front ends, each pressure lines operably connected in parallel to a single piezoresistive pressure sensor, wherein said pressure sensor generates said input signal to a Wheatstone Bridge wherein one branch of said bridge is operable to be set according to said nominal value.

14. An automatic drawing instrument according to claim 5 wherein said writing fluid source and pressure regulating mechanism comprises an electromagnetically controlled positive displacement pump.

15. An automatic drawing instrument according to claim 14 wherein said pump further comprises a plunger operable in response to said control signal to compress a bellows-type writing fluid storage chamber to thereby regulate the writing fluid pressure in said at least one tubular pen.

* * * * *